July 13, 1926.  1,592,305
H. H. LEWIS
CARBONATING APPARATUS
Filed March 25, 1921.   2 Sheets-Sheet 1
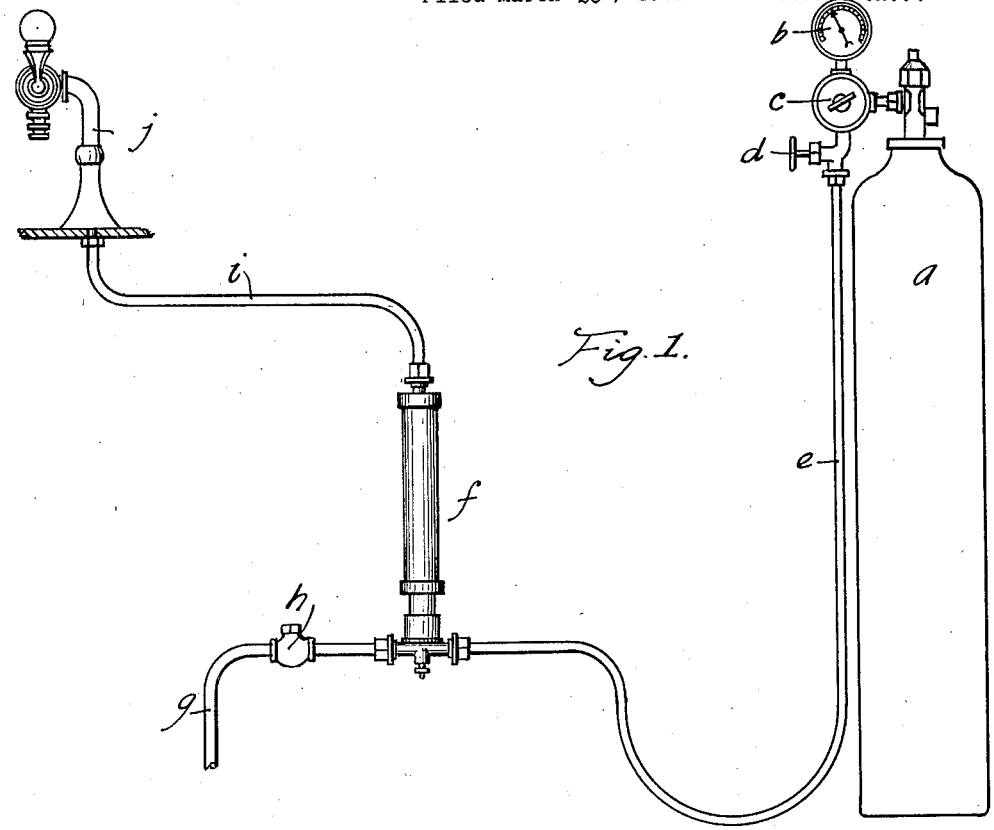
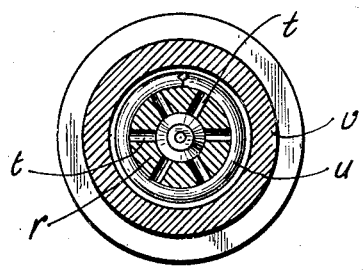
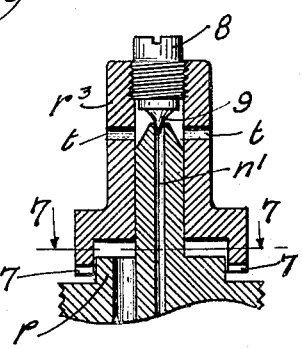
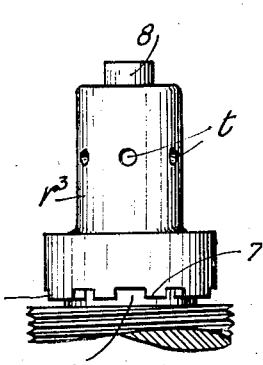
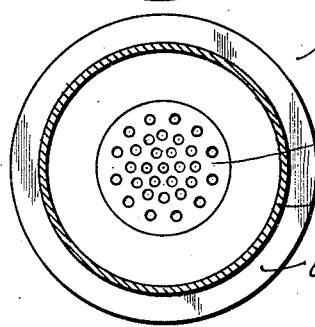
Inventor:
Harry H. Lewis July 13, 1926.
H. H. LEWIS
1,592,305
CARBONATING APPARATUS
Filed March 25, 1921   2 Sheets-Sheet 2
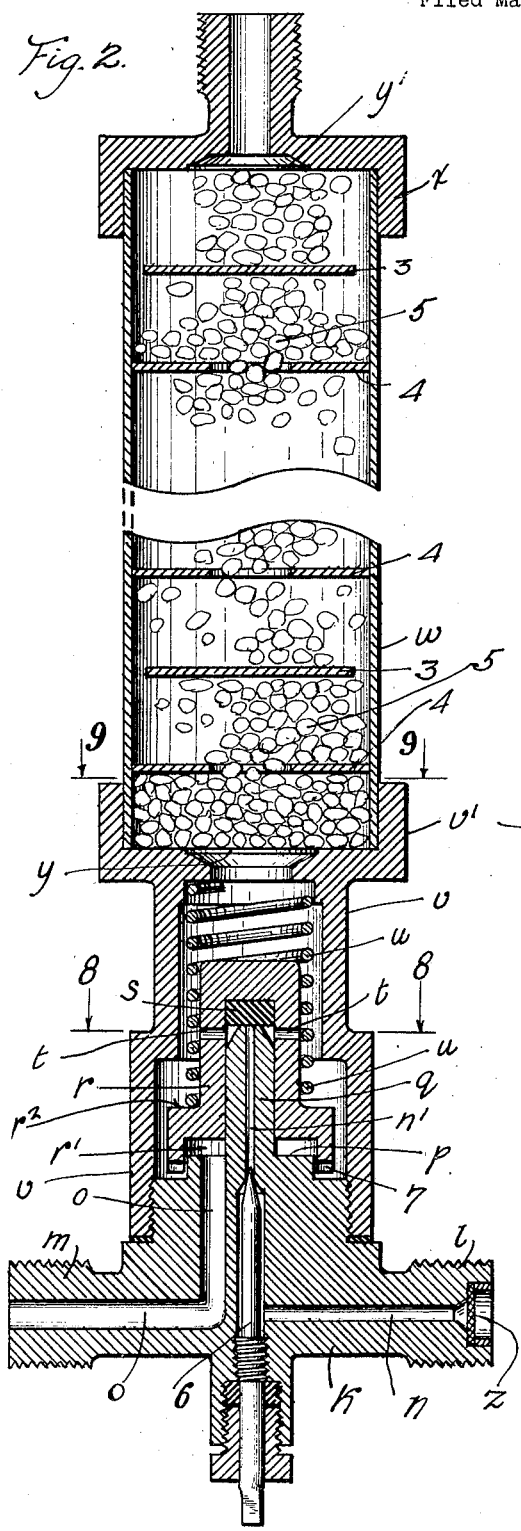
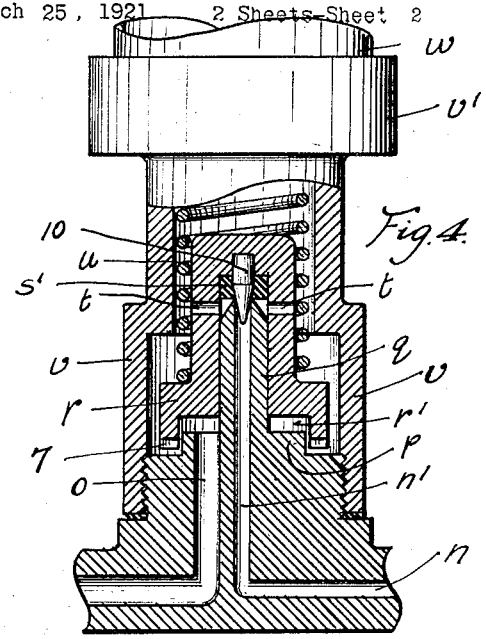
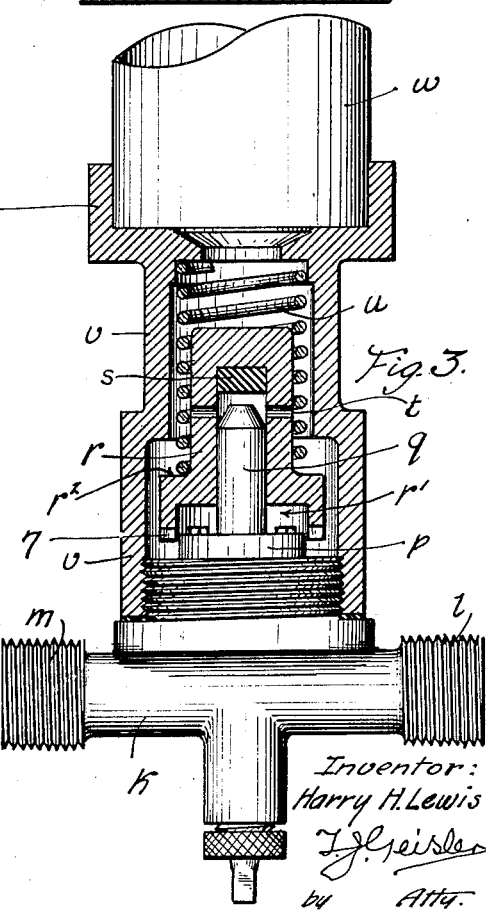
Inventor:
Harry H. Lewis
by Atty.

Patented July 13, 1926.

1,592,305

UNITED STATES PATENT OFFICE.

HARRY H. LEWIS, OF PORTLAND, OREGON.

CARBONATING APPARATUS.

Application filed March 25, 1921. Serial No. 455,697.

The object of my invention is to provide a simple yet efficient carbonating apparatus particularly adapted for use in connection with a "draft arm" of the so-called soda water fountain, the apparatus being thrown into action by the mere drawing of the soda water from the fountain.

To this end I have invented an apparatus which comprises as its fundamental feature a mixing chamber connected with heads of water and carbonic acid gas, both discharging into the mixing chamber; and I provide means whereby the discharge of the gas into the mixing chamber is proportioned relatively to the water, thus assuring the charging of a given volume of water with a definite volume of gas; and associated with said features are means for thoroughly intermixing the two substances.

For soda fountain purposes it is desirable to have an apparatus by which the water, as drawn from the city main under relatively low and varying pressure, will be efficiently charged with carbonic acid gas, drawn from a tank in which it is contained under relatively high pressure. Hence, when my invention is applied to a soda fountain I attain my object by controlling the outlet of the water from the main into the mixing chamber of my apparatus by a valve-like closure, or device, which is adapted to be hydraulically operated by the flow of water through the mixing chamber, and from the draft-arm of the fountain each time the valve of the draft-arm is opened; and such valve like device carries, and thus operates, the valve controlling the discharge of the gas into the mixing chamber, thereby causing the valves controlling the admission of the water and the gas into the mixing chamber to work in unison.

Mechanism of this character which controls mixtures of gas and water receive the gas at a relatively higher pressure than that at which they receive the water. The hole admitting the gas is made smaller than the hole admitting water for the mixture. When the conditions are normal the proportions of gas and water are correct, but when the demand is greater than normal the percentage of gas decreases relatively. This is because the inlet hole is smaller and thus prevents more than a certain amount of gas from passing therethru, and the hole for the water being relatively larger is thus not proportionately limited.

On the other hand, when the demand is less than normal, the mixture will be higher in relative percentage of carbonic gas. This is because the inlet hole for the gas does not hold the gas back because the relative velocity is low and therefore the smallness of the hole does not have a great retarding effect upon the gas passing therethru.

The object of my invention is therefore to automatically control this relationship between the gas and the water and thus correct the proportions in the mixture when the demand is abnormal either large or small.

I attain this object by providing the gas valve with a conical plug which is fastened to the actuator and thus increases the cross sectional area of the gas inlet proportionately to the lift of the actuator. I also make the base of the mixing chamber with a boss thru which the liquid inlet extends. The actuator is provided on its under side with a pendent peripheral flange having loose sliding contact with the sides of the boss and thus adapted to permit a limited flow from said liquid inlet sufficient to compensate for any small demand without lifting the actuator and opening the gas inlet.

A further object of my invention is to provide a mechanical control which will prevent the carbonic acid gas from escaping from the gas inlet even tho the water pressure is eliminated.

I attain my object by placing a spring so as to bear against the actuator so that it will normally close the gas inlet against the pressure exerted by the gas on the opposite face of the actuator.

My invention may also be used for mixing proportionately other liquids and gases.

The devices comprised in my invention, and by which I attain the results above referred to are hereinafter described, and illustrated in the accompanying drawings, in which:

Fig. 1 diagrammatically illustrates the installation of my apparatus for dispensing carbonated or "soda water" from the common soda-fountain draft-arm;

Fig. 2 shows a larger scaled longitudinal central section of my apparatus, thus disclosing the interior details of construction;

Fig. 3 shows the lower part of the section shown in Fig. 2 with the actuator as positioned when soda-water is drawn from the draft-arm;

Fig. 4 is a similar section to Fig. 3 illustrating a modification in the construction of the valve controlling the discharge of the gas into the mixing chamber of my apparatus;

Fig. 5 is a section of the valve-seat on which the actuator bears, and illustrates another modification of the valve controlling the discharge orifice of the gas duct.

Fig. 6 is an exterior view corresponding with Fig. 5 and particularly illustrates that the lower edge of the actuator is provided with guide-lugs so as to prevent it becoming out of alignment from the valve-seat;

Fig. 7 is a section corresponding with the cross section planes designated by the line 7—7 of Fig. 5;

Fig. 8 is a section approximately on the line 8—8 of Fig. 2; and

Fig. 9 is a cross section through the absorption chamber on the line 9—9 of Fig. 2.

Referring first to Fig. 1 $a$ represents a commercial cylinder containing a supply of carbonic-acid gas under high pressure. $b$ is a pressure gage; $c$ is a manual gas pressure regulator; $d$ is the gas cock; $e$ the pipe connecting the gas cylinder with my apparatus $f$ on one side; $g$ is the pipe connecting my apparatus $f$ with the water main; $h$ a check valve in the water pipe; $i$ the pipe leading from my apparatus to the draft arm $j$ of the so-called soda water fountain.

My apparatus is composed of the following parts: A base-piece $k$ is provided with coupling projections $l$ and $m$ for connecting with the gas cylinder and the water main. A duct $n$, $n'$ extends through one side of the basepiece and constitutes the gas duct and $o$ constitutes the water duct. The base-piece is made with a cylindrical projection $p$ constituting a valve seat and has a nozzle $q$ projecting axially a substantial distance beyond the valve seat $p$ the gas duct $n'$ extending to the tip of the nozzle and the water duct $o$ terminating in the valve seat $p$. On the valve seat $p$ is loosely and slidably mounted a valve like device $r$ which I find it convenient to term actuator because it functions to actuate the gas valve $s$, the latter being carried by the actuator and controlling the discharge orifice of the gas duct $n'$. As obvious, the actuator is adapted to be hydraulically operated, because it constitutes a partial valve-like closure for the water inlet or duct $o$.

The actuator is provided with a plurality of laterally and radially extending gas outlets $t$. On the actuator orifice $r^2$ bears a coil spring $u$.

The action of this spring $u$ is merely auxiliary to the pressure within the hollow cylinder $w$. This spring exerts enough force so that it will hold the actuating valve tight on the orifice of the gas duct $n'$ against the gas pressure even tho all of the water pressure is removed. The superiority of the force of the spring is slight and thus does not interfere with the proper action of the actuating valve. A housing $v$ is mounted on the base piece $k$ and the interior of this housing constitutes what I term the mixing chamber of my apparatus. The upper end $v'$ of the mixing chamber is adapted to have a hollow cylinder $w$ affixed therein, such cylinder constituting the absorption chamber of my apparatus. On the upper end of the absorption chamber is secured a cap $x$ to which the pipe $i$ leading to the draft arm of the soda water fountain is connected. The mixing chamber, as apparent, opens into the absorption chamber, and in the communicating opening is inserted a perforated plate $y$ constituting a screen. In the coupling neck $l$ of the base piece $k$ is also inserted a screen $z$.

In the absorption chamber I provide a series of transverse baffling plates as 3 and 4, one having a central opening and the other a space about its periphery and the entire interior of the absorption chamber is filled with pebbles or similar granular material, the baffling plates and granular material functioning to break up the water into numerous smaller quantities and thus promoting the intermixture therewith and the absorption of the carbonic-acid gas.

The screen $y$ and the granular material 5 will be adapted to prevent any particles of the latter from falling or entering into the mixing chamber $u$; also screen $y'$ at top.

The operation of my device is as follows: Assuming a pressure in the water head of 80 pounds and in the gas head of 90 pounds. First the water enters through the duct $o$ of the basepiece $k$ and is permitted to fill the interior of my apparatus; the filling of the latter being promoted by opening the valve controlling the draft arm of the soda water fountain. Next the gas-cock $d$ of the cylinder $a$ may be opened. When then the valve of the draft-arm is opened the pressure of the water against the interior $r'$ of the actuator $r$ lifts the latter, compressing the coil spring $u'$ and proportionally to the lift of the actuator $r$ the gas-valve $s$ is lifted from its seat on the tip of the nozzle $q$, thus permitting gas to enter the mixing chamber $v$ through the radial outlets $t$ of the actuator.

The volume of gas which is permitted to flow into the mixing chamber by the lifting of the gas-valve $s$ is regulated by the needle valve 6. The adjustment of the needle valve 6 is important to the proper operation of my apparatus, since, of course, it is required to permit only the desired volume of gas to enter the mixing chamber.

The actuator $r$ slides loosely on the rim of the protruding valve seat $p$; and in order to prevent the actuator from becoming displaced the lower rim thereof is provided with guide-lugs 7.

The actuator does not close the liquid inlet because the actuator $r$ slides loosely on the rim of the protruding valve $p$ and thus a limited amount of water can flow from the liquid inlet without moving the actuator $r$ off its seat over the discharge orifice of the gas duct $n'$. If there is a limited demand for mixture in the draft arm, due to leaks or similar causes, the fresh supply to the cylinder $w$ will be entirely water. This loose fit between the actuator $r$ and the rim of the protruding valve $p$ also prevents the actuator $r$ from being held off its seat by the entrapped water which would thus present an incompressible column against the interior $r'$ of the actuator $r$.

As soon as the valve of the draft-arm of the soda-water fountain is closed the checking of the flow of water through the mixing chamber will cause the pressure on the interior and exterior of the actuator to become equalized to such extent that the reaction of the spring will reseat the actuator, thus closing the discharge orifice of the gas-duct.

The water pressure in the mixing chamber will vary from time to time correspondingly to the variation of pressure in the main due to varying water consumption; but the pressure of the gas will be kept constant, due to the operation of the standard gas-pressure regulator $c$, and thus at all times the gas may be maintained at a pressure greater than that of the water.

With the parts proportioned as shown, the bearing surface of the gas valve is too small to permit the gas to force this valve open against the pressure of the spring $u$. On the other hand, when the valve of the draft arm is opened, thus permitting the water from the main to flow through the mixing chamber, then the pressure of the water, due to its velocity through the duct $o$ and the relatively large bearing surface of the water on the actuator, will overcome the spring $u$ and thus move the actuator into the position which opens the gas valve.

A suitable check valve $w$ is provided in the water-pipe $g$ so as to prevent the pressure in the mixing chamber causing any back flow into the water pipe, and thus preventing the waste of gas, in case the gas valve $s$ should not function properly.

While in the drawings, my apparatus has been placed in vertical position, such position is obviously immaterial. In some instances it is found preferable so to arrange my apparatus that it will project downward; for if projecting upward the gas which accumulates at the top of the absorption chamber $w$ may cause a gurgling noise when opening the valve of the draft-arm, while if my apparatus is inverted the gas would of course collect at the opposite end of the absorption chamber, and the water would have a more unobstructed passage through the draft-arm.

In order to assure an effective closing of the discharge orifice of the gas-duct a construction shown in Figs. 5 and 6 may be employed. In this instance the actuator $r^3$ has threaded into it an adjustable plug 8 having at its lower end a tapering projection 9 which bears in the discharge orifice of the gas-duct $n'$ and constitutes the gas valve and thus assures that the gas-valve will always properly be operated and will effectively close said discharge-orifice when the actuator $r^3$ is returned to its normal or inactive position.

A further modification which may be made in the construction of the gas valve of my apparatus is illustrated in Fig. 4. In this instance the disk $s'$ of the gas-valve is provided with a conical projection 10, which bears in the discharge-orifice of the gas duct $n'$, and when the actuator is in its normal or inactive position the conical projection will close said discharge orifice.

As the actuator is lifted, due to the pressure of the water against the interior $r'$ of the actuator $r$, the conical plug 10 will be gradually removed from the discharge orifice. The gradual withdrawing of the plug will cause the gradual uncovering of the gas duct $n'$. It therefore follows that the gas inlet will be opened proportionately to the lift of the actuator. If there is a large demand the gas will be permitted to flow at a relatively greater rate and thus will compensate for the natural retardation to the flow of the gas thru a restricted orifice.

Thus the last described construction has special utility where the carbonated water is used in larger quantities, as for example in a bottling plant, than normally, or more than normal is drawn from a soda water fountain and where it is desirable to increase the quantity of gas admitted proportionately to the increase of the carbonated water used; for the faster the water rushes through the duct $o$ the greater will be the lift of the actuator from its valve seat $p$ and correspondingly the greater will be the opening of the discharge orifice of the gas duct.

The gas pressure from the cylinder may be regulated as required by means of the gas pressure regulator as usual.

I have described my apparatus as adapted for carbonating water, since such was its primary purpose; and from such description it is apparent how my apparatus may also be used to mix other liquids and gases, under conditions similar to those which obtain in the charging of water with carbonic-acid gas.

I claim:

1. In a carbonating apparatus of the character described, a mixing chamber connected with a head of liquid and a head of gas, and having an inlet for each, a draft-arm connected with said mixing-chamber, a hydraulically operated actuator adapted for being moved in one direction by the pressure of the liquid passing into said mixing-chamber, said actuator covering said liquid inlet, and carrying the valve of said gas-inlet, the base of the mixing chamber, and the actuator being provided with a boss and a peripheral flange having loose sliding contact with the sides of said boss respectively and adapted to permit limited flow therefrom, sufficient to compensate for any small reduction of pressure in the mixing chamber, without lifting the actuator and opening said gas-inlet, and a spring adapted normally so to position said actuator as to close said gas inlet against said gas head.

2. In a carbonating apparatus of the character described, a mixing-chamber connected with a head of liquid and a head of gas, and having an inlet for each, a draft-arm connected with said mixing-chamber, a hydraulically operated actuator adapted for being moved in one direction by the pressure of the liquid passing into said mixing chamber, said actuator covering said liquid inlet, and carrying the valve of said gas-inlet, the base of the mixing chamber and the actuator being provided with a boss and a peripheral flange having loose sliding contact with the sides of said boss respectively and adapted to permit limited flow therefrom, sufficient to compensate for any small reduction of pressure in the mixing chamber, without lifting the actuator and opening said gas-inlet, said gas valve being adapted to open the gas-inlet proportionately to the lift of said actuator, substantially as described, and a spring adapted normally so to position said actuator as to close said gas inlet against said gas head.

3. In a carbonating apparatus of the character described, a mixing-chamber connected with a head of liquid and a head of gas, and having an inlet for each, a draft-arm connected with said mixing chamber, a hydraulically operated actuator adapted for being moved in one direction by the pressure of the liquid passing into said mixing-chamber, said actuator and said inlets carrying devices for carrying the flow from both of said inlets, the devices being so arranged that the flow from both of said inlets is increased in proportion to the lift of said actuator.

4. In a carbonating apparatus of the character described, a mixing-chamber adapted to be connected with a head of liquid and a head of gas, and having an inlet for each in its base, a draft-arm connected with said mixing-chamber, a hydraulically operated actuator adapted for being moved in one direction by the pressure of the liquid passing into said mixing-chamber, said actuator covering and substantially closing said liquid inlet, and carrying the valve of said gas-inlet, the moving of said actuator serving to increase the size of the apertures in both of said inlets proportionately to the movement of said actuator.

5. In a carbonating apparatus of the character described, a mixing-chamber having a base having a liquid duct and a gas duct adapted for connecting with a head of liquid and a head of gas respectively, the base being provided with a projecting nozzle thru which the gas-duct extends, a hydraulically operated actuator provided with a tubular extension, closed at its upper end, sliding on said nozzle and carrying the valve of said gas-duct, the base of the mixing chamber and said actuator being provided with a boss and a peripheral flange having loose sliding contact with the sides of said boss respectively, thereby permitting a limited flow of liquid into the mixing chamber, sufficient to compensate for any small reduction of pressure in the latter, without lifting the actuator and thus opening said gas duct.

6. In a carbonating apparatus of the character described, a mixing-chamber having a base having a liquid duct and a gas duct adapted for connecting with a head of liquid and a head of gas respectively, the base being provided with a projecting nozzle thru which the gas-duct extends, a hydraulically operated actuator provided with a tubular extension, closed at its upper end, sliding on said nozzle and carrying the valve of said gas-duct, the base of the mixing chamber, and said actuator being provided with a boss and a peripheral flange having loose sliding contact with the sides of said boss respectively, thereby permitting a limited flow of liquid into the mixing chamber, sufficient to compensate for any small reduction of pressure in the latter, without lifting the actuator and thus opening said gas duct, said gas-valve being adapted to open the gas-duct proportionately to the lift of said actuator substantially as described.

7. In a carbonating apparatus of the character described, a mixing-chamber having a base having a liquid duct and a gas duct adapted for connecting with a head of liquid and a head of gas respectively, the base being provided with a projecting nozzle thru which the gas-duct extends, a hydraulically operated actuator provided with a tubular extension, closed at its upper end, sliding on said nozzle and carrying the valve of said gas-duct, the base of the mixing chamber, and said actuator being provided with a boss and a peripheral flange having loose sliding contact with the sides of said boss respectively, thereby permitting a limited flow of liquid into the mixing chamber, sufficient to compensate for any small reduction of pressure in the latter, without lifting the actuator and thus opening said gas duct, and a spring adapted normally so to position said actuator as to close said gas-duct against the gas-head.

8. In a carbonating apparatus of the character described, a mixing-chamber having a base having a liquid duct and a gas duct adapted for connecting with a head of liquid and a head of gas respectively, the base being provided with a projecting nozzle thru which the gas-duct extends, a hydraulically operated actuator provided with a tubular extension, closed at its upper end, sliding on said nozzle and carrying the valve of said gas-duct, the base of the mixing chamber, and said actuator being provided with a boss and a peripheral flange having loose sliding contact with the sides of said boss respectively, thereby permitting a limited flow of liquid into the mixing chamber, sufficient to compensate for any small reduction of pressure in the latter, without lifting the actuator and thus opening said gas duct, said gas-valve being conical thus adapted to open the gas-duct proportionately to the lift of said actuator substantially as described, and a spring adapted normally so to position said actuator as to close said gas-duct against the gas-head.

HARRY H. LEWIS.